United States Patent
Vodyakho et al.

(10) Patent No.: US 9,553,539 B2
(45) Date of Patent: Jan. 24, 2017

(54) METHODS OF GENERATING OUTPUT VARIABLE VOLTAGE FOR ELECTRIC DRIVE DEVICES AND SYSTEMS THEREOF

(71) Applicant: Deere & Company, Moline, IL (US)

(72) Inventors: Oleg Vodyakho, Fargo, ND (US); Kent Wanner, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 110 days.

(21) Appl. No.: 14/471,259

(22) Filed: Aug. 28, 2014

(65) Prior Publication Data

US 2016/0065063 A1    Mar. 3, 2016

(51) Int. Cl.
| | |
|---|---|
| H02M 3/158 | (2006.01) |
| H02P 27/02 | (2016.01) |
| H02M 3/156 | (2006.01) |
| H02P 27/04 | (2016.01) |
| H02M 7/5387 | (2007.01) |

(52) U.S. Cl.
CPC .............. *H02P 27/02* (2013.01); *H02M 3/156* (2013.01); *H02M 3/158* (2013.01); *H02P 27/047* (2013.01); *H02M 7/5387* (2013.01)

(58) Field of Classification Search
CPC .................................................... H02M 3/158
USPC ......................................................... 323/271
See application file for complete search history.

(56) References Cited

U.S. PATENT DOCUMENTS

| | | | |
|---|---|---|---|
| 9,270,223 B2 | 2/2016 | Wu et al. | |
| 2006/0145672 A1* | 7/2006 | Kernahan | H02M 3/157 323/271 |
| 2007/0091653 A1 | 4/2007 | Leggate et al. | |
| 2012/0049818 A1* | 3/2012 | Hester | H02M 3/1582 323/282 |
| 2012/0086382 A1 | 4/2012 | Peto | |
| 2012/0257770 A1 | 10/2012 | Lee et al. | |
| 2015/0091544 A1* | 4/2015 | Jayaraj | H02M 3/156 323/284 |

OTHER PUBLICATIONS

International Search Report and Written Opinion dated Nov. 6, 2015.

(Continued)

*Primary Examiner* — Matthew Nguyen
*Assistant Examiner* — Trinh Dang
(74) *Attorney, Agent, or Firm* — Harness, Dickey & Pierce, P.L.C.

(57) ABSTRACT

At least one example embodiment discloses a method of generating an output variable voltage. The method includes obtaining a selected mode of operation, the selected mode of operation being one of an voltage control mode and a frequency mode, determining an input voltage command based on the selected mode of operation, determining an input frequency command based on the selected mode of operation, adjusting at least one of the input frequency command and the input voltage command based on the selected mode of operation, generating a pulse width modulation reference based on the adjusted at least one of the input frequency command and the input voltage command and generating the output variable voltage based on the pulse width modulation reference.

22 Claims, 13 Drawing Sheets

(56) References Cited

OTHER PUBLICATIONS

"Yaskawa AC Drive-V1000 Compact Vector Control Drive Technical Manual", Yaskawa Electric SIEP, 1-498 pages, May 2012, Yaskawa Electic Corporation.
"PowerFlex 70/700 Adjustable Frequency AC Drives", Allen-Bradley Reference Manuel, 1-214 pages, Jun. 2013, Rockwell Automation, Inc.

* cited by examiner

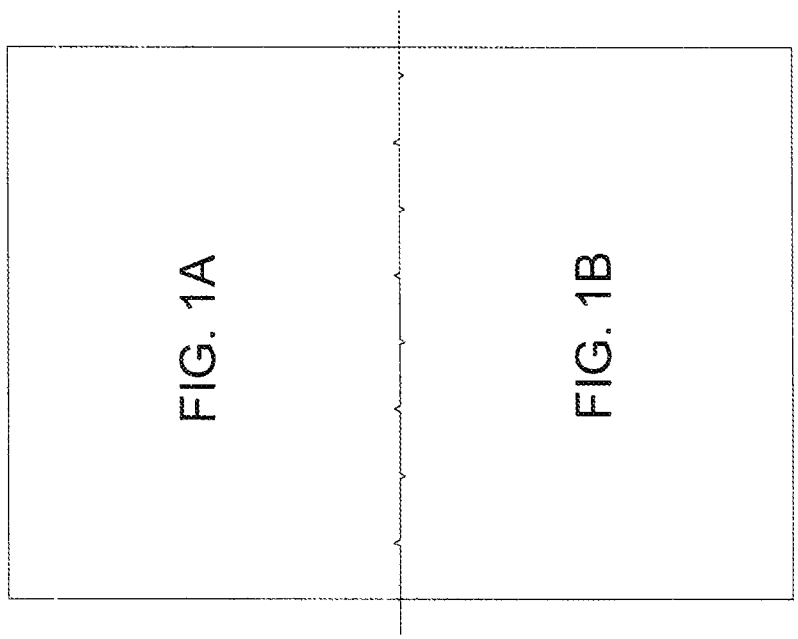

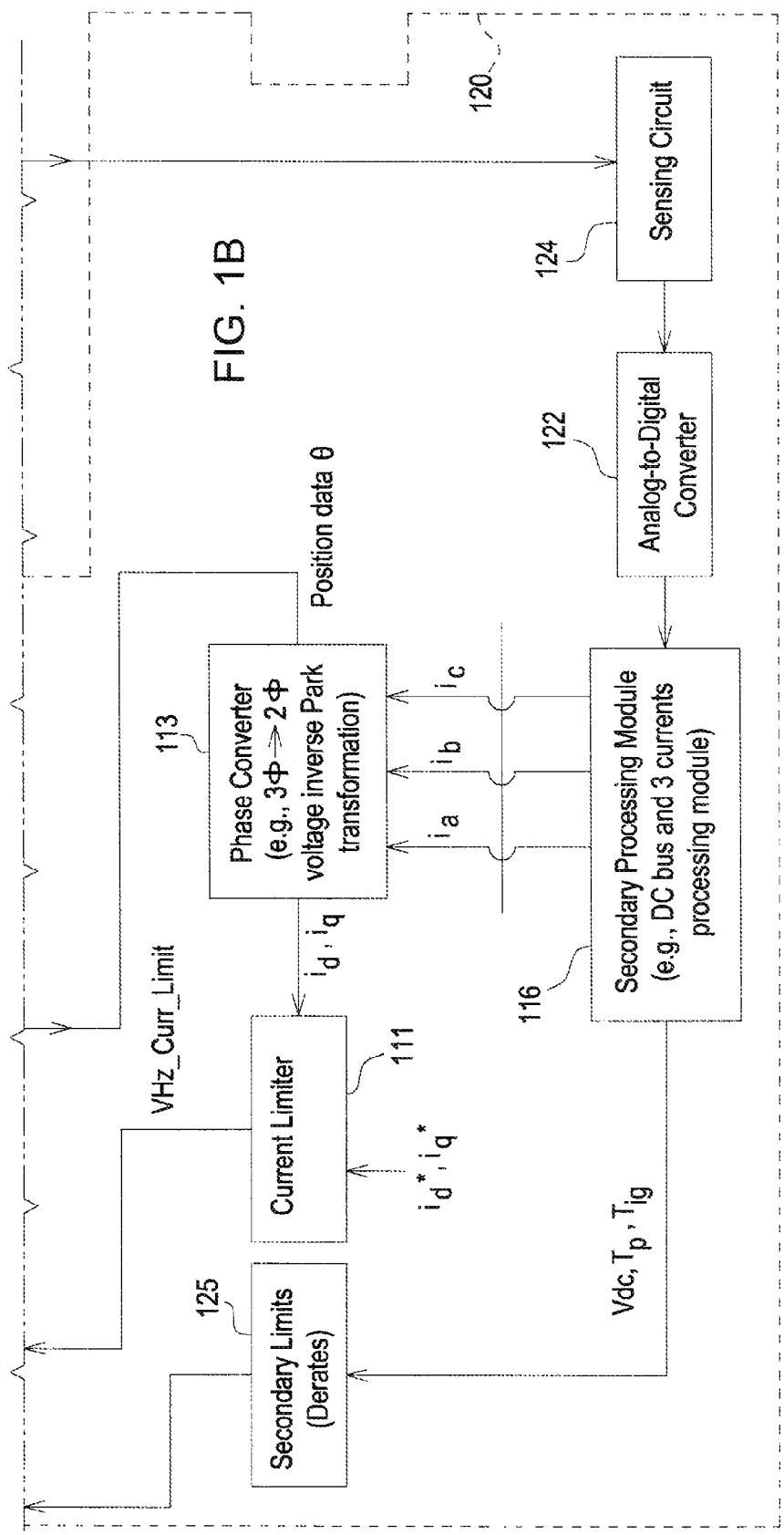

METHODS OF GENERATING OUTPUT VARIABLE VOLTAGE FOR ELECTRIC DRIVE DEVICES AND SYSTEMS THEREOF

FIELD

Example embodiments are related to electric drive device systems and/or methods for controlling electric drive devices.

BACKGROUND

Electric drive devices, such as alternating current (AC) induction motors are used to power systems such as hybrid/electrical vehicles, auxiliary pumps, air compressors, fans, etc. AC induction motors have been widely used for industry applications. A fault-free across-the-line starting capability with Variable Frequency Drives (VFD) may be used with the induction motors. A controller for the drive device controls operation of the drive device. The controller produces control signals which are applied to the terminals of the drive device.

Typically, the controller controls the drive device based on a plurality of information such as a terminal voltage of the drive device and frequency information of the machine.

SUMMARY

Some example embodiments are directed to methods and apparatuses for generating an output variable voltage.

In an example embodiment, a power voltage supply for powering system components (e.g. auxiliary pumps, fans, etc.) is configured to operate in one of two different control modes, a voltage control mode and a frequency control mode. No active power source is attached to the AC terminals. This allows the setting of a voltage in a voltage control mode and the setting of a voltage/frequency relationship (V/Hz) in a frequency control mode.

In the voltage control mode, the power voltage supply may operate as a 3-phase outlet (in open/closed loop control) that supplies a constant voltage at a desired frequency while providing protection for the supply and load.

In the frequency control mode (Volts/Hz Mode), the power voltage supply maintains a commanded frequency and the output voltage based on the configurable relationship to a commanded frequency (linear or squared).

At least one example embodiment discloses a method of generating an output variable voltage. The method includes obtaining a selected mode of operation, the selected mode of operation being one of an voltage control mode and a frequency mode, determining an input voltage command based on the selected mode of operation, determining an input frequency command based on the selected mode of operation, adjusting at least one of the input frequency command and the input voltage command based on the selected mode of operation, generating a pulse width modulation reference based on the adjusted at least one of the input frequency command and the input voltage command and generating the output variable voltage based on the pulse width modulation reference.

BRIEF DESCRIPTION OF THE DRAWINGS

Example embodiments will be more clearly understood from the following detailed description taken in conjunction with the accompanying drawings. FIGS. 1-5 represent non-limiting, example embodiments as described herein.

FIG. 1 illustrates a block diagram of FIGS. 1A-1B;

FIGS. 1A-1B is a block diagram of a system for controlling an electrical motor, according to an example embodiment;

FIG. 2 is a block diagram of an electronic data processing system consistent with FIGS. 1A-1B, according to an example embodiment;

FIG. 5 illustrates a method of generating an output variable voltage, according to an example embodiment.

DETAILED DESCRIPTION

Figure 1A:
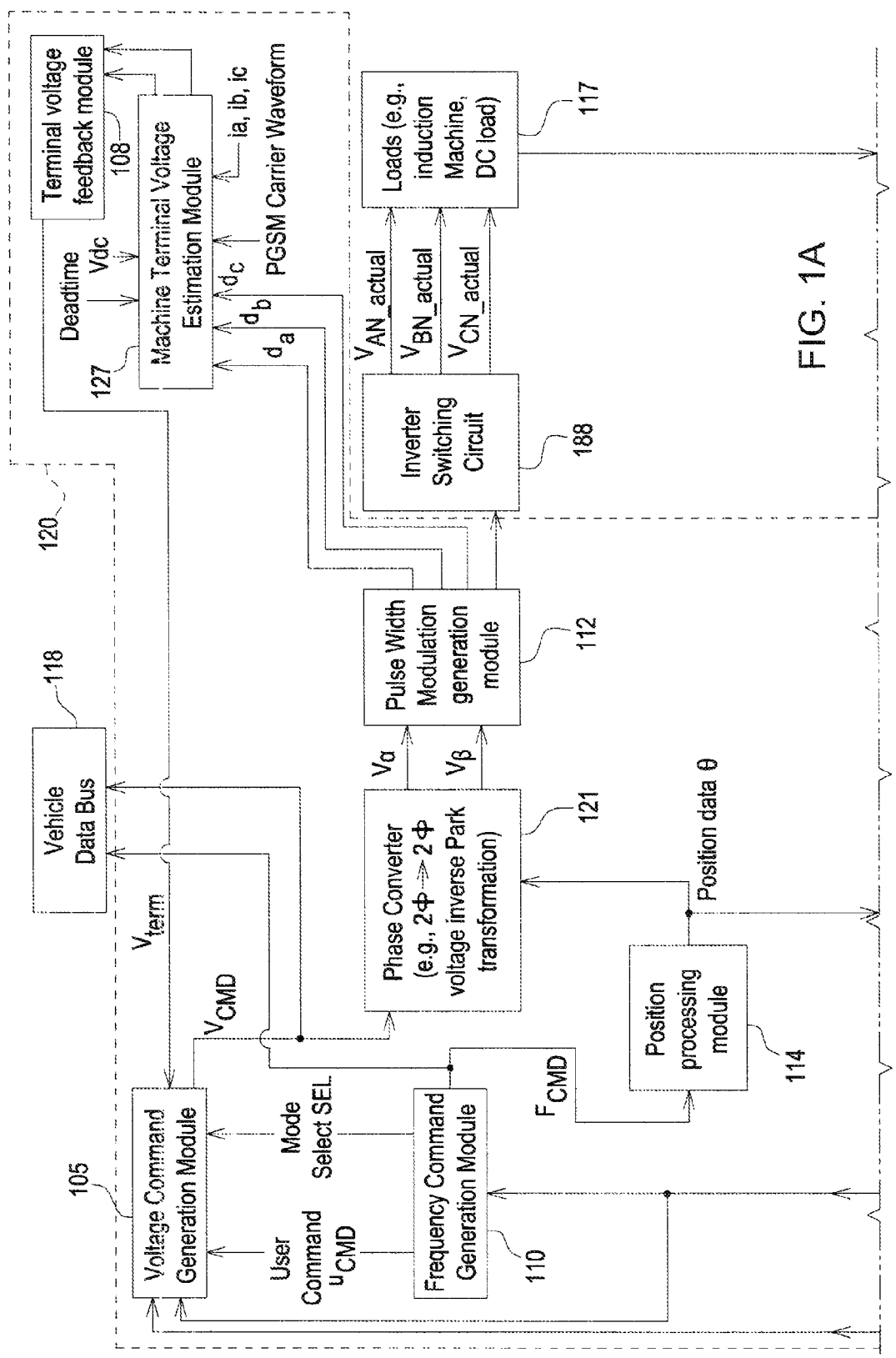

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be an electronic memory, read only, non-volatile electronic random access memory, one or more electronic data registers, data latches, a magnetic disc drive, a hard disc drive, an optical disc drive, or the like.

In accordance with an example embodiment, FIGS. 1A-1B illustrate a drive system 100 for controlling a load such as an electric motor. The drive system 100 may be referred to as a control device or a power supply for the load. The drive system 100 is configured to operate in one of two different control modes, which allows the setting of a voltage in a voltage control mode and a voltage/frequency (V/Hz) relationship in a frequency control mode.

At least one example embodiment discloses a control device configured to generate an output variable voltage. The control device including a processor configured to obtain a selected mode of operation, the selected mode of operation being one of an voltage control mode and a frequency mode, determine an input voltage command based on the selected mode of operation, determine an input frequency command based on the selected mode of operation, adjust at least one of the input frequency command and the input voltage command based on the selected mode of operation, generate a pulse width modulation reference based on the adjusted at least one of the input frequency command and the input voltage command, and generate the output variable voltage based on the pulse width modulation reference.

In an example embodiment, the processor is configured to obtain a selected part of the voltage control mode, the selected part being one of an open loop control part and a closed loop control part.

In an example embodiment, the processor is configured to generate the input voltage command based on the selected part.

In an example embodiment, the processor is configured to select one of a plurality of voltage commands as the input voltage command, wherein each of the plurality of voltage commands corresponds to one of the voltage control mode and the frequency mode.

In an example embodiment, the processor is configured to select one of a plurality of frequency commands as the input frequency command, wherein each of the plurality of frequency commands corresponds to one of the voltage control mode and the frequency mode.

In an example embodiment, the processor is configured to generate the output variable voltage according to a fixed relationship between the output variable voltage and the adjusted input frequency command in the frequency mode.

In an example embodiment, the processor is configured to adjust the at least one of the input frequency command and the input voltage command based on at least one of a temperature limit, a current limit, a current slew limit, a voltage limit and a voltage slew limit.

In an example embodiment, the processor is configured to adjust the input voltage command if the selected mode of operation is the voltage control mode.

In an example embodiment, the processor is configured to maintain the input frequency command before and after the adjusting.

In an example embodiment, the processor is configured to adjust the input frequency command if the selected mode of operation is the frequency mode.

In an example embodiment, the processor is configured to generate the output variable voltage according to a fixed relationship between the output variable voltage and adjust the input frequency command in the frequency mode.

The electrical motor may be a motor such as an induction motor (IM) motor, another alternating current machine or a direct current machine. The motor has a nominal dc bus voltage (e.g., 320 Volts). The nominal voltage is a named voltage. For example, a nominal voltage of the motor may be 320 Volts, but the motor may operate at a voltage above and below 320 Volts.

In an example embodiment, the system, aside from the load 117 and an inverter switching circuit 188, may be referred to as a controller.

It should be understood that the drive system 100 may include additional features that are not illustrated in FIGS. 1A-1B. The features shown in FIGS. 1A-1B are illustrated for the convenience of describing the drive system 100 and it should be understood that the drive system 100 should not be limited to the features shown in FIGS. 1A-1B.

The system 100 includes electronic modules, software modules, or both. In an example embodiment, the drive system 100 includes an electronic data processing system 120 to support storing, processing or execution of software instructions of one or more software modules. The electronic data processing system 120 is indicated by the dashed lines in FIG. 1A-1B and is shown in greater detail in FIG. 2. The electronic data processing system 120 may also be referred to as a controller and/or processor for the load 117. The data processing system 120 is configured to determine a control mode, select a modulation mode, and determine a plurality of terminal phase voltages of the machine based on the control mode. Modulation mode may refer to PWM, square wave, triangular wave, or sine wave, or the frequency, duty cycle or dead time associated with any of the foregoing. Control mode may be one of a voltage control mode and a frequency control mode, for example.

The data processing system 120 is coupled to the inverter circuit 188. The inverter circuit 188 may be a three-phase inverter. The inverter circuit 188 includes a semiconductor drive circuit that drives or controls switching semiconductors (e.g., insulated gate bipolar transistors (IGBT) or other power transistors) to output control signals for the load 117. In turn, the inverter circuit 188 is coupled to the load 117.

In an example embodiment, a voltage command generation module 105 is configured to receive a user command $U_{CMD}$ from a user, a mode select signal SEL from the user, an estimated machine terminal voltage $V_{term}$ and secondary limits $Limit_{AC\_Sec}$. The user command $U_{CMD}$ and the mode select signal SEL may be received over a vehicle data bus 118. The voltage command generation module 105 is configured to generate a voltage command $V_{CMD}$ based on the user command $U_{CMD}$, the mode select signal SEL, the estimated machine terminal voltage and the secondary limits. The user command $U_{CMD}$ indicates a desired a voltage in the voltage control mode or a desired frequency to voltage relationship in frequency control mode. The mode select signal SEL indicates one of a voltage control mode and a frequency control mode.

A frequency command generation module 110 is configured to generate a frequency command $F_{CMD}$ based on the user command $U_{CMD}$ and the mode select signal SEL.

As shown in FIG. 1, the voltage command $V_{CMD}$ and the frequency command $F_{CMD}$ are fed to the vehicle data bus 118 for monitoring.

The current regulation limiter 111 is capable of communicating with the frequency command generation module 110. The current regulation limiter 111 receives respective final d-q axis current commands (e.g., $i_d^*$ and $i_q^*$) and actual d-q axis currents (e.g., $i_d$ and $i_q$). The d-q axis current refers to the direct axis current and the quadrature axis current as applicable in the context of vector-controlled alternating current machines, such as the load 117. While the term current command is used, it should be understood that current command refers to a target current value.

The current regulation limiter 111 generates a current limit VHz_Curr_Limit from the actual d-q axis currents. The current limit VHz_Curr_Limit represents a slewed final current limit command. The current regulation limiter 111 limits the up-ramp rate and down-ramp rate of the current limit. When up-ramp rate of a maximum current limit or a minimum current limit is greater than an up-ramp rate set point, the current limit ramp rate will be limited as the value of the up-ramp rate set point. When the down-ramp rate of a maximum current limit or the minimum current limit is greater than a down-ramp rate set point, the current limit ramp rate will be limited as the value of the down-ramp rate set point.

The current regulation limiter 111 samples the actual d-q axis currents $i_d$ and $i_q$ and calculates an RMS current $I_{RMS}$ based on the actual d-q axis currents using any known method. The current regulation limiter 111 then compares the RMS current $I_{RMS}$ to a set current limit Set_Current_Limit, which may be determined by a user based on empirical data.

In order to relate the measured total RMS current $I_{RMS}$ to the set current limit parameter Set_Current_Limit, a total RMS current difference RMS_Current_Difference may be defined as:

$$RMS\_Current\_Difference = Set\_Current\_Limit - I_{RMS} \quad (1)$$

If a difference between the RMS current $I_{RMS}$ and the set current Set_Current_Limit exists (RMS_Current_Difference), the difference RMS_Current_Difference is scaled by an integral gain and fed to a proportional integrator (PI) in the current regulation limiter 111.

The output of the PI controller is subject to a slew limit block, which prevents a command step when the PI controller is disabled. The slewed output of the PI controller in the current regulation limiter 111 is the current limit VHz_Curr_Limit.

In an example embodiment, the PWM generation module 112 provides pulse commands for control of the inverter circuit 188 and provides duty ratios $d_a$, $d_b$, $d_c$ for each phase (a, b and c) of the inverter circuit 188 to a terminal voltage estimation module 127. The processing system 120 determines the three phase duty ratios $d_a$, $d_b$ and $d_c$, as described in U.S. application Ser. No. 14/141,631, entitled Methods of Determining Machine Terminal Voltage and Systems thereof, the entire contents of which are hereby incorporated by reference.

Then, based on voltage commands $V_\alpha$ and $V_\beta$, the duty ratios, deadtime, and PWM carrier waveform, the PWM pulses are created by the PWM generation module 112 and sent to the inverter circuit 188. The three phase duties $d_a$, $d_b$, $d_c$ are sent to the terminal voltage estimation module 127. Outputs of the PWM generation module 112 are coupled to an inverter circuit 188. The output stage of the inverter circuit 188 (e.g., output present phase voltages $V_{AN\_actual}$, $V_{BN\_actual}$ and $V_{CN\_actual}$) provides a pulse-width modulated voltage waveform or other voltage signal for control of the load 117. The voltages $V_{AN}$, $V_{BN}$ and $V_{CN}$ may be referred to as phase voltages, current control step voltages or present control step voltages, for example. In an example embodiment, the inverter circuit 188 is powered by a direct current (dc) voltage bus.

The inverter circuit 188 includes a semiconductor drive circuit that drives or controls switching semiconductors (e.g., insulated gate bipolar transistors (IGBT) or other power transistors) to output control signals for the load 117. In turn, the inverter circuit 188 is coupled to the load 117. A sensor (e.g., a position sensor, a resolver or encoder position sensor) may be associated with a motor shaft or the rotor of the motor. The sensor and the load 117 are coupled to the data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the load 117.

The position processing module 114 determines a position θ based on the frequency command $F_{CMD}$ as:

$$\theta = \int F_{cmd} dt \qquad (2)$$

where θ the position data; $F_{CMD}$ is the frequency command; and dt is the sampling rate of the processing system 120.

Position data θ for the load 117 is communicated from the position processing module 114 to the phase converter 121 (e.g., two-phase to two-phase inverse Park transformation module) that converts the voltage command $V_{CMD}$ from d-q voltage commands into voltage commands $V_\alpha$ and $V_\beta$ for the PWM module 112.

An input of a sensing circuit 124 is coupled to terminals of the load 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 which outputs a measured dc bus voltage Vdc, temperature of phase windings Tp, IGBT temperature Tig and measured three phase currents is, ib and ic. The sensing circuit 124 is associated with the load 117 for measuring the three phase currents (e.g., current applied to the windings of the load 117, back EMF (electromotive force) induced into the windings, or both).

Certain outputs of the position processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and ic from the secondary processing module 116 and position data θ from the position processing module 114. The output of the phase converter 113 module ($i_d$, $i_q$) is coupled to the current regulation limiter 111.

Based off of the three phase duties ratios $d_a$, $d_b$, $d_c$, the PWM carrier waveform generated by the PWM generation module 112, and phase currents $i_a$, $i_b$ and $i_c$, a machine terminal voltage estimation module 127 estimates the inverter present phase voltages $V_{AN}$, $V_{BN}$, and $V_{CN}$ of the actual inverter output voltages $V_{AN\_actual}$, $V_{BN\_actual}$ and $V_{CN\_actual}$. Then the estimated inverter output voltages $V_{AN}$, $V_{BN}$, and $V_{CN}$ are used by the machine terminal voltage estimation module 127 to calculate the estimated machine terminal voltage. Comparing the estimated terminal voltage with a terminal voltage limit will create an error sent to a PI controller to create and adjust d-axis current and eventually adjust q-axis current.

Figure 2:
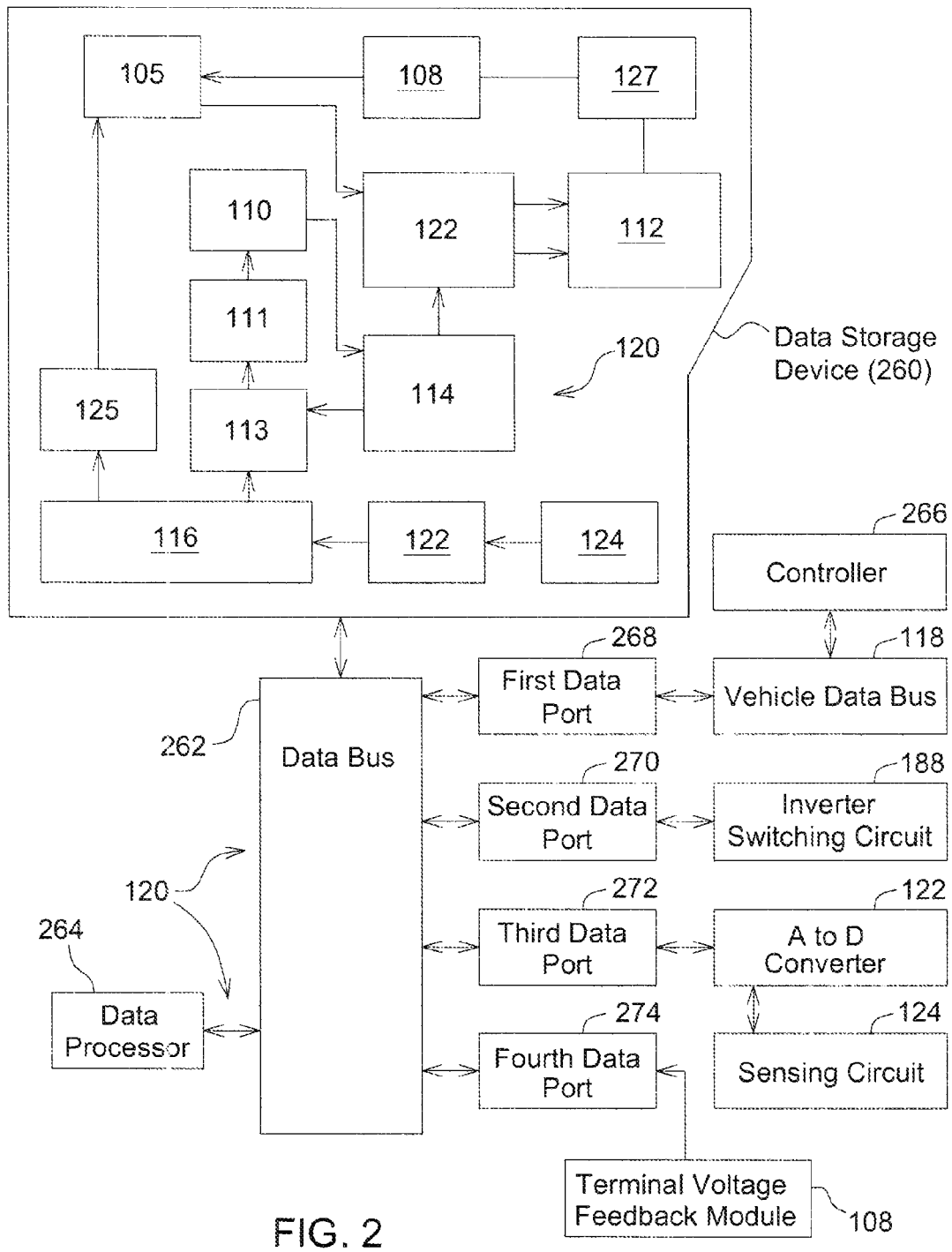

FIG. 2 is a block diagram of an electronic data processing system consistent with FIGS. 1A-1B, according to an example embodiment. In FIG. 2, the electronic data processing system 120 includes an electronic data processor 264, a data bus 262, a data storage device 260, and one or more data ports (268, 270, 272 and 274). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272 and a fourth data port 274, although any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the analog-to-digital converter 122; and the fourth data port 274 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to the vehicle data bus 118, such as a controller area network (CAN) data bus. The vehicle data bus 118 may provide data bus messages with voltage and frequency commands to the voltage command generation module 105 and the frequency command generation module 110. A user may generate the voltage commands via a user interface, the controller 266, or other control devices.

In some example embodiments, the primary processing module 114 may be associated with or supported by a port of the data processing system 120.

The data processor 264 may be specifically programmed to execute the voltage command generation module 105, the frequency command generation module 110, the current regulation limiter 111, the PWM generation module, the phase converter 113, the position processing module 114, the secondary processing module 116, the secondary limiters 125, the terminal voltage feedback module 108 and the machine terminal voltage estimation module 127.

Figure 3A:
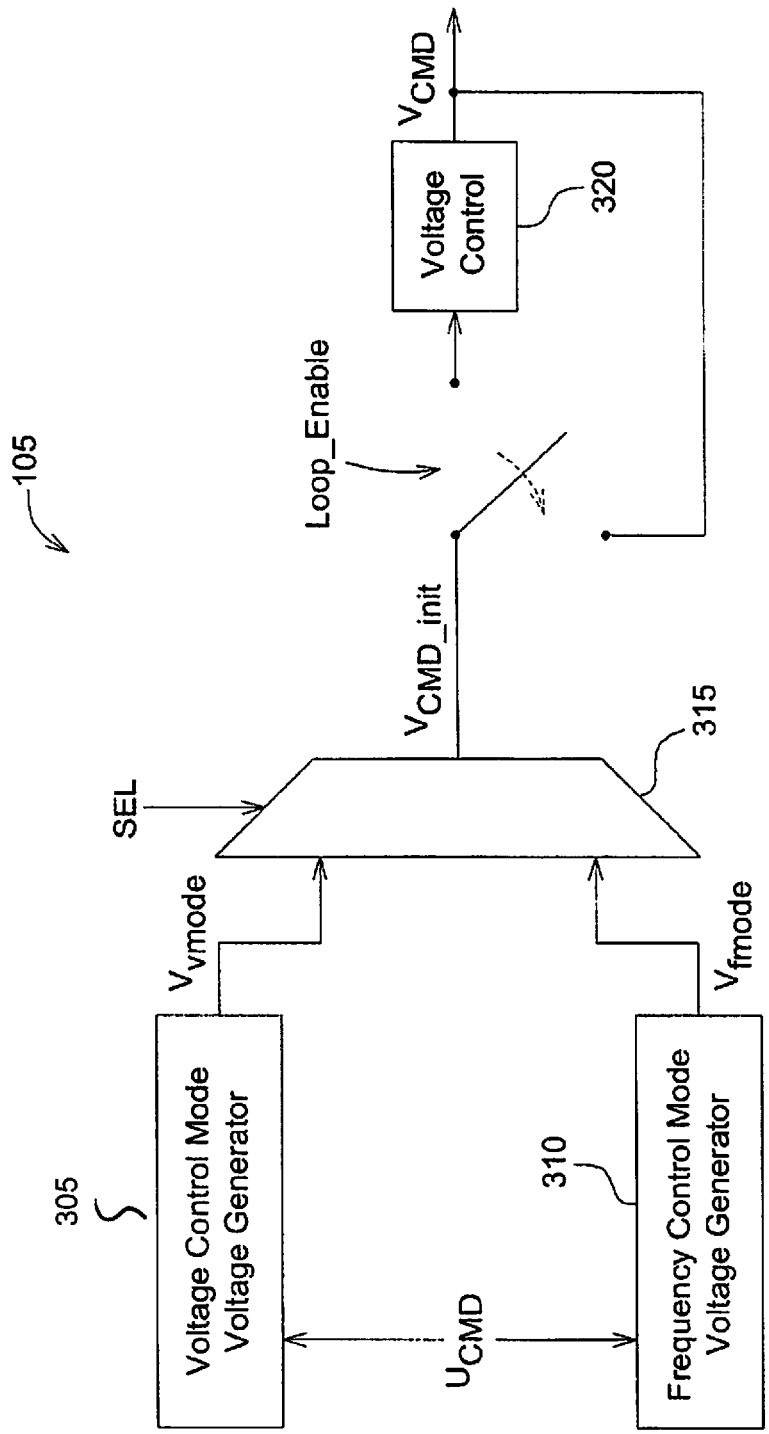
FIG. 3A illustrates an example embodiment of the voltage command generation module, according to an example embodiment.

FIG. 3A illustrates an example embodiment of the voltage command generation module 105. As shown in FIG. 3A, the voltage command generation module 105 includes a voltage control mode voltage generator 305, a frequency control mode voltage generator 310, a selector 315 and a voltage control module 320.

The voltage control mode voltage generator 305 generates a voltage command $V_{vmode}$ for the voltage control mode based on the user command $U_{CMD}$. The voltage control mode voltage generator 305 operates in an open loop control or a closed loop control.

Figure 3B:
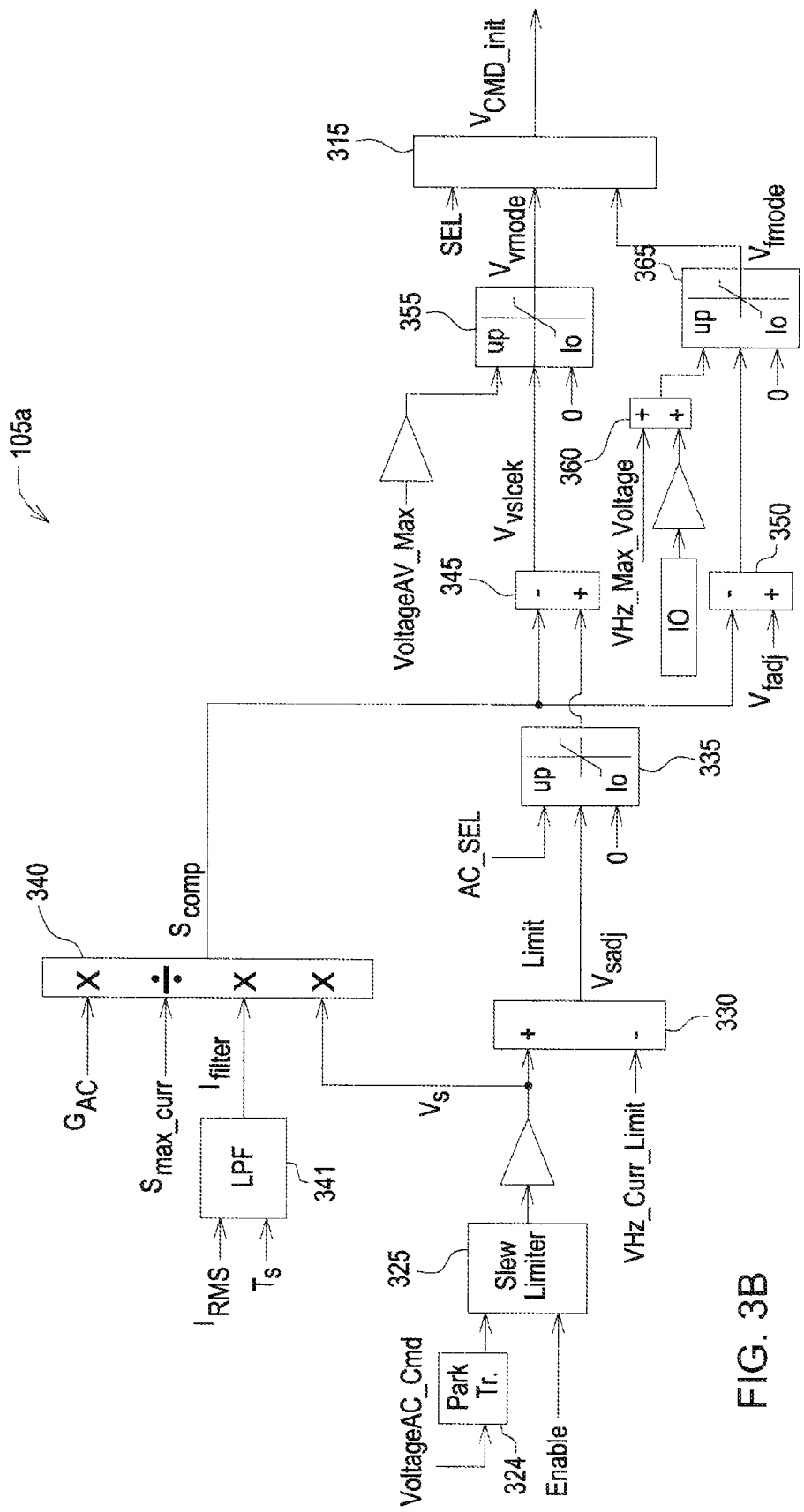
FIGS. 3B-3D illustrate portions of the voltage command generation module, according to an example embodiment.
Figure 3C:
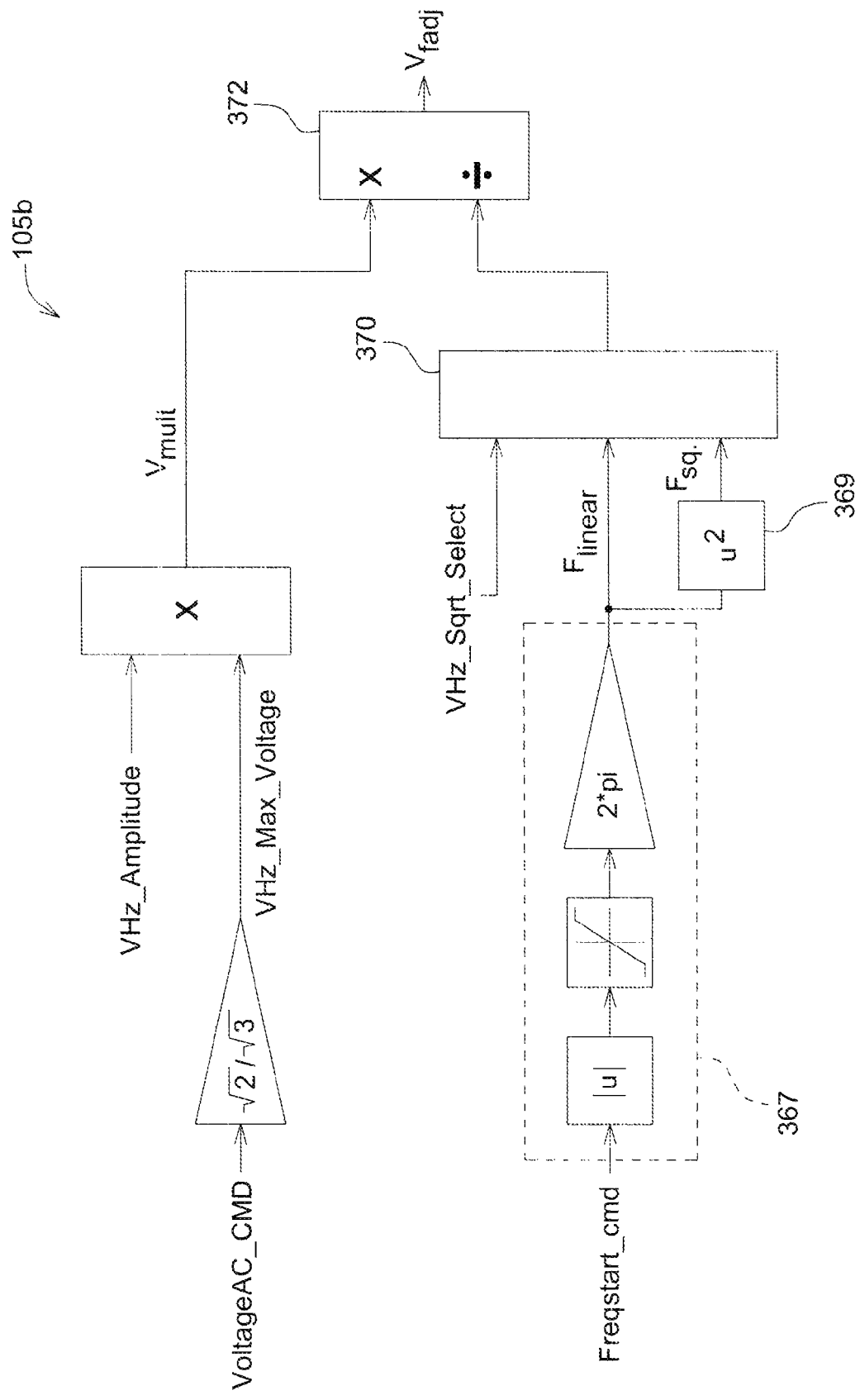

FIGS. 3B-3C illustrate portions of the voltage command generation module 105 in more detail.

FIG. 3B illustrates a portion 105a of the voltage command generation module 105. As shown in FIG. 3B, a slew limiter 325 receives a voltage command VoltageAC_Cmd and an enable signal Enable. The enable signal Enable may be generated by the user to enable the data processing system 120. The voltage command VoltageAC_Cmd is the user command $U_{CMD}$ when the user selects the voltage control mode. The voltage command VoltageAC_Cmd is selected AC line-to-line voltage commands (e.g., $V_{AB}$, $V_{AC}$, $V_{BC}$) set using a CAN Command (or parameter #XXX AC Supply Default Voltage Command, if no CAN command is present) at a specific frequency. The DC Bus voltage is greater than the selected AC line-to-line voltage.

As shown in FIG. 3B, the voltage command VoltageAC_CMD is transformed

The voltage command VoltageAC_CMD determines a $V_d$, $V_q$ voltage command in a stationary reference frame using a Park transformation 324.

As should be understood, reference frame refers to a coordinate system used to represent and measure properties such as position (e.g., angular rotational position), velocity, torque, electrical parameters, and orientation of the rotor of the motor, the stator of the motor, or both. In a stationary reference frame, the position (e.g., angular rotational position), rotational velocity, torque, electrical parameters and orientation of the rotor, the stator, or both are observed from a stationary observer's point of view. A stationary reference frame may refer to the case where the reference frame is aligned with the stator of the motor, or where the d-axis and the q-axis do not rotate with the rotor. For the rotor or stator, a stationary reference frame is mutually exclusive to a rotating reference frame.

In a rotating reference frame, the instantaneous stator currents of a multi-phase motor can be expressed as a single complex stator current vector in a Cartesian coordinate system. If a Park transform or a similar transform is applied to the complex stator current vector, the reference frame has direct axis (d-axis) and quadrature axis (q-axis) components that rotate with rotor flux position (e.g., local maximum in magnetic field). For a motor with permanent magnets attached to the rotor the rotor flux position does not change with respect to the rotor, as opposed to where electromagnets are used in certain rotors.

The slew limiter 325 limits an up-ramp rate and down-ramp rate of the $V_d$, $V_q$ voltage command. When an up-ramp rate of a maximum voltage command or a minimum voltage command is greater than an up-ramp rate set point, the voltage command ramp rate is limited as the value of the up-ramp rate set point. When a down-ramp rate of the maximum voltage command or the minimum voltage command is greater than the down-ramp rate set point, the voltage command ramp rate will be limited as the value of the down-ramp rate set point.

The slewed voltage command output from the slew limiter 325 is then transformed into a terminal voltage space vector $V_s$ by multiplying the slewed voltage command by $\sqrt{2}/\sqrt{3}$. The terminal voltage space vector $V_s$ is then subjected to a current limiter 330. The current limiter 330 compares the current limit VHz_Curr_Limit from the current limiter 111 to the terminal voltage space vector $V_s$ and adjusts the terminal voltage space vector $V_s$ based on the current limit VHZ_Curr_Limit as follows:

$$V_{sadj} = V_s - \text{VHZ\_Curr\_Limit} \quad (3)$$

Module 335 limits the output of the current limiter 330 by secondary AC limits $\text{Limit}_{AC\_Sec}$ and generates an adjusted voltage command $V_{vadj}$.

The secondary AC Limits $\text{Limit}_{AC\_Sec}$ may include a winding temperature limit, an IGBT temperature limit and a DC Bus Voltage limit.

The secondary AC Limits $\text{Limit}_{AC\_Sec}$ may be used to dynamically reduce the available output (voltage/frequency) from 100% to 0% when the limiting variable is within derate beginning and ending points. Derating using the secondary AC Limits $\text{Limit}_{AC\_Sec}$ may use an Absolute Limit Method or a Ratio Limit Method. In an example embodiment, the user may select between the Absolute Limit Method and the Ratio Limit Method. In other words, the data processing system 120 may switch between the Absolute Limit Method and the Ratio Limit Method.

In the case of the secondary AC Limits $\text{Limit}_{AC\_Sec}$, the output of the derating is slew-rate limited. In an example embodiment, an output limit from one secondary AC Limit is compared with all other secondary AC Limits. The lowest output limit is then output by the module 335.

The Absolute Limit Method allows configuring of derates based on absolute values. Each limiting variable has a configurable derate begin (100% output) and derate end (0% output). The graphs below illustrate this method.

The Ratio Limit Method allows configuring of derates based on relative differences from a setpoint. The setpoint may be set via a CAN Message Each limiting variable has a configurable derate begin (100% output) and derate end (0% output).

The terminal voltage space vector $V_s$ is also input to a slack compensator 340. The slack compensator 340 performs slack compensation based on the terminal voltage space vector $V_s$, the RMS current $I_{RMS}$, a maximum current slack $S_{max\_curr}$ and an AC voltage slack gain $G_{AC}$.

The maximum current slack $S_{max\_curr}$ is an amount of current slack selected by the user. The AC voltage slack gain $G_{AC}$ is an amount of slack compensation selected by the user. The AC voltage slack gain $G_{AC}$ is used when running in the voltage or frequency control mode. A positive value AC voltage slack gain $G_{AC}$ reduces the AC Line-Line voltage command by a percentage of the available output. A negative value AC voltage slack gain $G_{AC}$ increases the AC Voltage Line-Line voltage command.

The RMS current $I_{RMS}$ is filtered using a first order low-pass filter 341 with a sampling rate Ts. An output of the low-pass filter $I_{filter}$ is input to the slack compensator 340.

Slack compensation promotes load sharing between multiple controllers connected to a same load and to compensate for impedance between the controller(s) and a remote load.

Negative slack can be used to improve output voltage regulation. This is done by boosting the AC Line-Line voltage command VoltageAC_Cmd as the phase current is increased, from no boost at zero current, to full boost at 100% current. This can be used to compensate for the voltage drop across a line filter or a long set of cables. An amount of boosting voltage may be limited by 10 Volts, as shown in the input to an adder 360.

The voltage command generation module 105 then adds the slack compensation $S_{comp}$ to the adjusted voltage command for the voltage control mode $V_{vadj}$, using a module 345, and adds the slack compensation $S_{comp}$ to an adjusted voltage command for the frequency control mode $V_{fadj}$, using a module 350.

FIG. 3C illustrates a portion 105b of the voltage command generation module 105 that generates the adjusted voltage command for the frequency control mode $V_{fadj}$.

In the frequency control mode, the voltage command VoltageAC_CMD is generated based on the frequency command from the user Freq$_{start\_cmd}$ and a V/Hz ratio. As shown in FIG. 3C, the voltage command VoltageAC_CMD is multiplied voltage command $\sqrt{2}/\sqrt{3}$, to generate a voltage command VHz_Max_Voltage, and then multiplied by a magnitude VHz_Amplitude to generate a voltage command V$_{mult}$.

A module 367 processes the frequency command Freq$_{start\_cmd}$ to generate a liner relationship frequency F$_{linear}$. The module 367 determines the absolute value the frequency command Freq$_{start\_cmd}$, ensures that the absolute value is within desired limits and multiplies the absolute value within the limits by 2*pi to generate the linear relationship frequency F$_{linear}$.

A module 369 converts the linear relationship frequency F$_{linear}$ into a squared relationship frequency F$_{sq}$.

The parameter VHZ_Sqrt_Select indicates a selected V/Hz relationship such as linear or squared. A linear V/Hz relationship is a straight line from zero to a rated voltage and frequency. A volts/hertz ratio can be changed to provide increased torque performance by modifying a starting frequency parameter. The volts/hertz ratio creates a fixed relationship between an output voltage and an output frequency.

The parameter VHZ_Sqrt_Select is used to create additional running torque at low speeds. The value is typically less than the required acceleration torque. The drive will lower the starting voltage when running at low speeds (not accelerating). This reduces excess motor heating that could be caused if a higher starting voltage were used.

When a squared V/Hz option is used, the relationship is $1/X^2$. Therefore, for full frequency, full voltage is supplied and for ½ rated frequency, ¼ voltage is applied, etc. This pattern closely matches a torque requirement of a variable torque load (centrifugal fan or pump—load increases as speed increases) and offers energy savings for these applications.

A selector 370 selects one of the linear relationship frequency F$_{linear}$ and the squared relationship frequency F$_{sq}$ based on the parameter VHZ_Sqrt_Select.

A module 372 then divides the voltage command V$_{mult}$ by the selected frequency to generate the voltage command for the frequency control mode V$_{fadj}$.

Referring back to FIG. 3B, the module 345 outputs a slack compensated voltage command for the voltage control mode V$_{vslack}$. A limiter 355 limits the slack compensated voltage command for the voltage control mode V$_{vslack}$ to between an upper limit of a maximum voltage limit in the voltage control mode Voltage_AC_Max multiplied by $\sqrt{2}/\sqrt{3}$ and a lower limit of zero. The limiter 355 outputs the voltage V$_{vmode}$ as a result of limiting the slack compensated voltage command for the voltage control mode V$_{vslack}$ to between a maximum voltage limit multiplied by $\sqrt{2}/\sqrt{3}$ and zero.

The adder 360 limits an amount of slack compensation (e.g., 10V) to the voltage command VHz_Max_Voltage plus 10 Volts. It should be understood that another value may be used for the amount of slack compensation based on empirical data.

The module 350 outputs a slack compensated voltage command for the frequency control mode V$_{fslack}$. A limiter 365 limits the slack compensated voltage command for the frequency control mode V$_{fslack}$ to between the output from the adder 360 and zero. The limiter 365 outputs the voltage V$_{fmode}$ as a result of limiting the slack compensated voltage command for the frequency control mode V$_{fslack}$ to between the output from the adder 360 and zero.

A selector 315 selects one of the voltages V$_{vmode}$ and V$_{fmode}$ based on the selected control mode. More specifically, if the selection signal SEL indicates the voltage control mode, the selector 315 outputs the voltage V$_{vmode}$ as an initial voltage command V$_{CMD\_init}$. If the selection signal SEL indicates the frequency control mode, the selector 315 outputs the voltage V$_{fmode}$ as the initial voltage command V$_{CMD\_init}$.

Referring back to FIG. 3A, the initial voltage command V$_{CMD\_init}$ may be subjected to a closed loop voltage controller 320 based on a control signal Loop_Enable. More specifically, the initial voltage command V$_{CMD\_init}$ may be subjected to closed loop voltage control in the voltage control mode. In other words, in the voltage control mode, the voltage command generation module 105 may operate in either an open loop control mode or a closed loop control mode. In the frequency control mode, the voltage command generation module 105 operates in the open loop control mode.

Figure 3D:
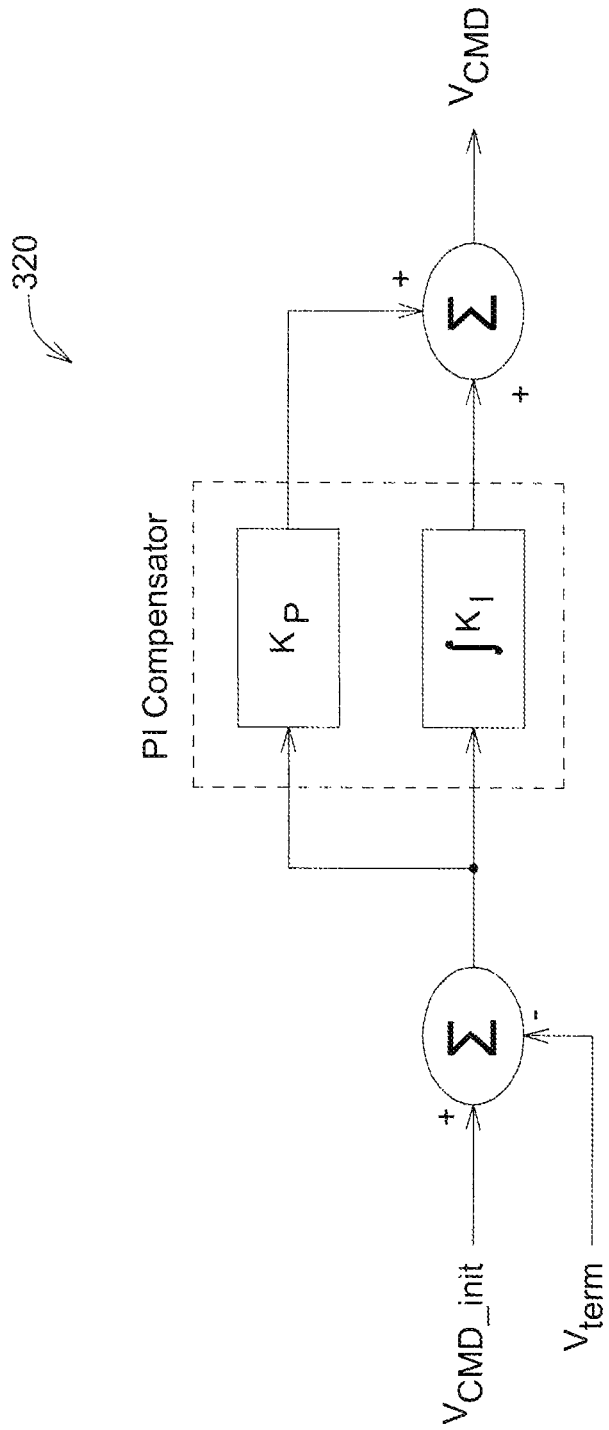

FIG. 3D illustrates an example embodiment of the closed loop voltage controller 320. The closed loop voltage controller 320 determines a difference between the initial voltage command VCMD_init and the terminal voltage V$_{term}$ from the feedback module 108. Calculation of the terminal voltage V$_{term}$ is described in U.S. application Ser. No. 14/141,631, entitled Methods of Determining Machine Terminal Voltage and Systems thereof, the entire contents of which are hereby incorporated by reference.

The user sets the K$_P$ and K$_I$ tuning parameters based on empirical data and system responsiveness.

The closed loop voltage controller 320 then outputs the voltage command V$_{CMD}$ to the phase converter 121. The voltage command V$_{CMD}$ represents V$_d$ and V$_q$ values. In an example embodiment, V$_q$ is zero.

Figure 4A:
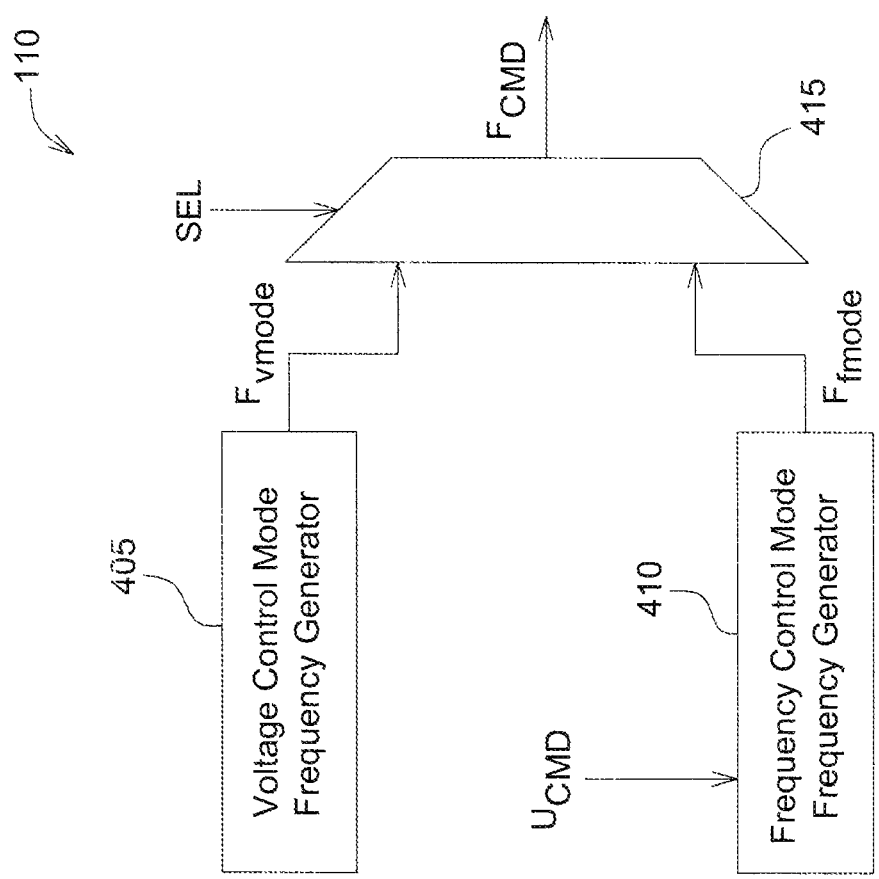
FIG. 4A illustrates an example embodiment of the frequency command generation module.

FIG. 4A illustrates an example embodiment of the frequency command generation module 110. As shown, the frequency command generation module 110 includes a voltage control mode frequency generator 405 and a frequency control mode frequency generator 110.

Figure 4B:
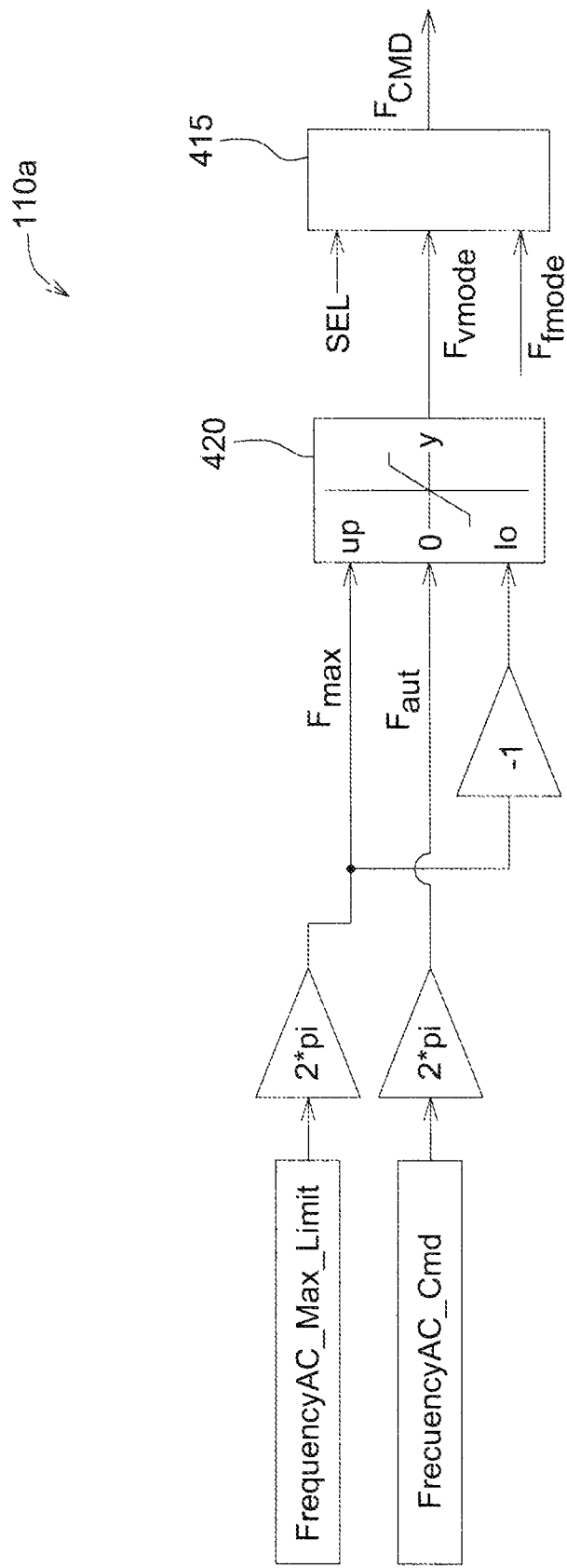
FIGS. 4B-4D illustrate portions of the frequency command generation module, according to an example embodiment.

FIG. 4B illustrates a portion 110a of the frequency command generation module 110 that generates the frequency command F$_{CMD}$.

The frequency command generation module 110 multiples a frequency command FrequencyAC_CMD by 2*pi to generate a frequency command F$_{cvt}$ and multiplies the maximum frequency FrequencyAC_Max by 2*pi to generate a maximum frequency command F$_{max}$. In FIG. 4B, the frequency command FrequencyAC_CMD is a nominal frequency in the voltage control mode and the maximum frequency may be based on empirical data and limits of the load 117.

A limiter 420 limits the frequency command F$_{cvt}$ to be between the positive and negative values of the maximum frequency command F$_{max}$.

The output of the limiter 420 is a frequency command F$_{vmode}$ for the voltage control mode.

Figure 4C:
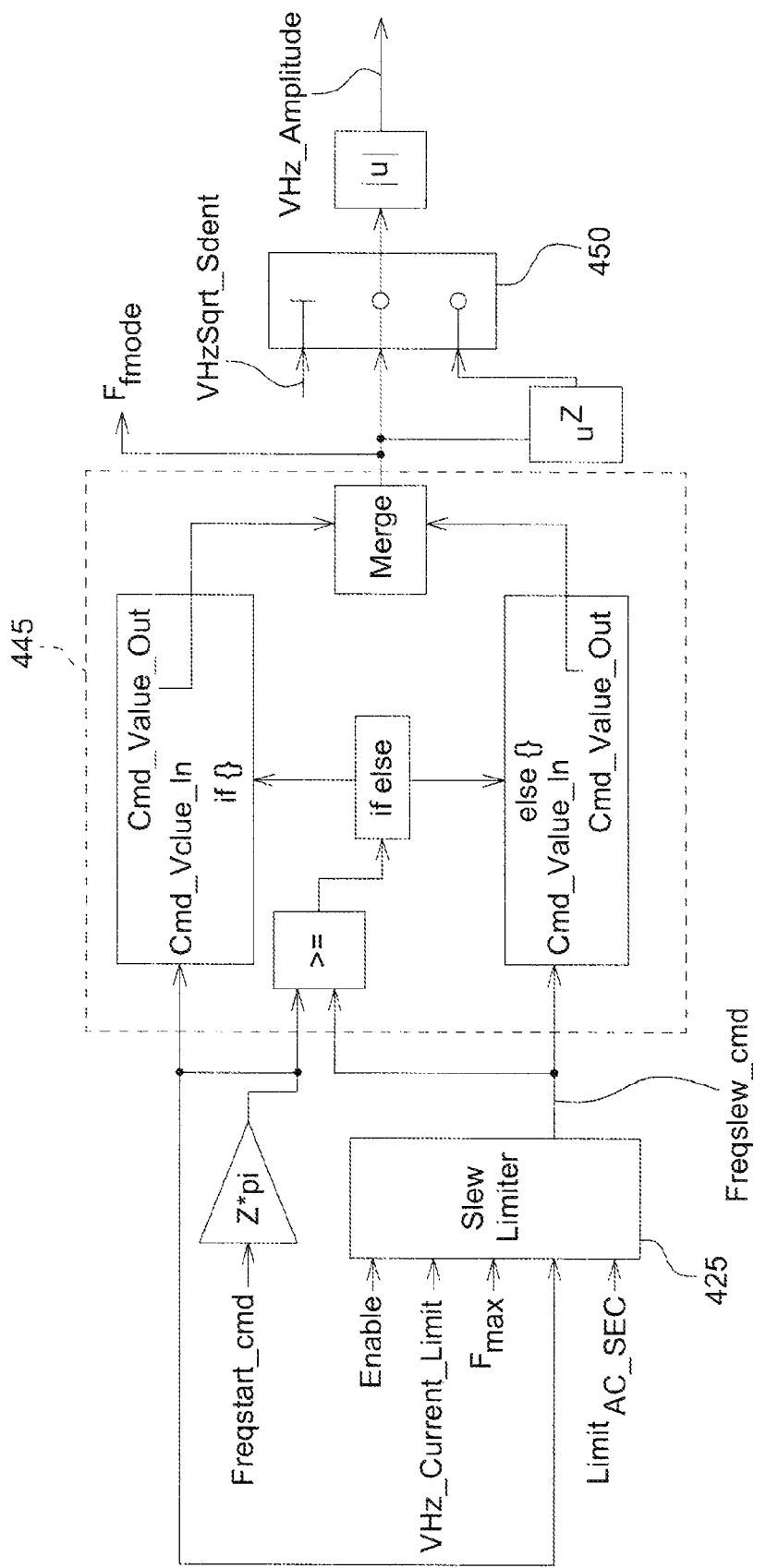

FIG. 4C illustrates a portion 110b of the frequency command generation module 110 that generates the frequency command F$_{fmode}$ in the frequency control mode.

As shown, the frequency command generation module 110 receives a frequency start command Freq$_{start\_cmd}$ from the user. In other words, in the frequency control mode, the user command U$_{CMD}$ is the frequency start command Freq$_{start\_cmd}$. The frequency command generation module 110 multiples the frequency start command Freq$_{start\_cmd}$ by 2*pi.

A slew limiter 425 limits the product of the frequency start command $Freq_{start\_cmd}$ and 2*pi based on the secondary AC limits $Limit_{AC\_Sec}$, the product of the maximum frequency FrequencyAC_Max and 2*pi, and the current limit VHz_Curr_Limit. The slew limiter 425 outputs a slewed frequency command $Freq_{slew\_cmd}$.

Figure 4D:
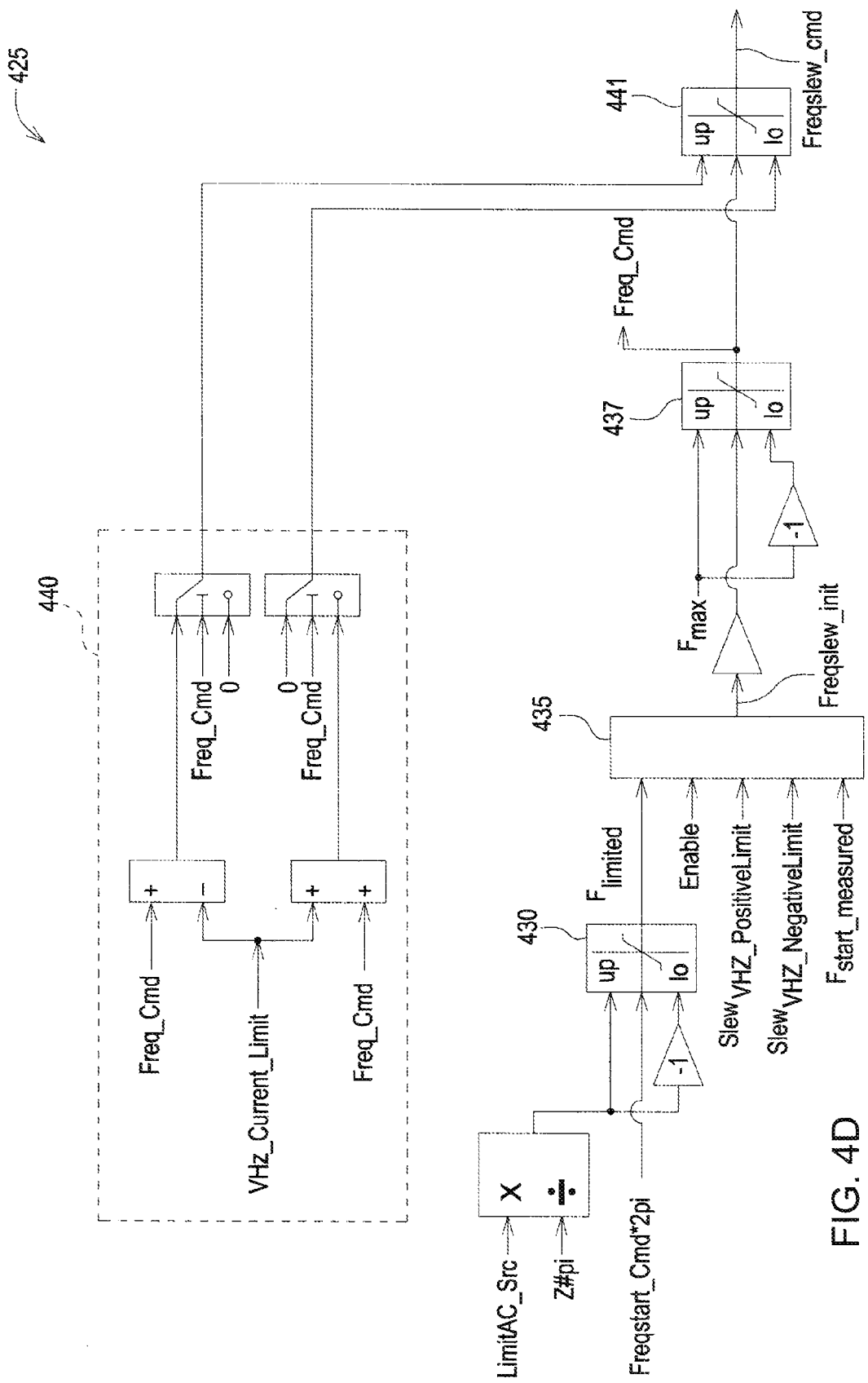

FIG. 4D illustrates an example embodiment of the slew limiter 425.

As shown in FIG. 4D, a limiter 430 limits the product of the frequency command Freqstart_cmd and 2*pi based on the secondary AC limits $Limit_{AC\_Sec}$ to generate a limited frequency command $F_{limit}$. The limiter 430 operates in a similar manner as the limiter 335 except the limiter 430 limits a frequency command, not a voltage command. Therefore, for the sake of brevity, the limiter 430 will not be further described.

A slew limiter 435 further limits the limited frequency command Flimit based on negative and positive slew rate limits $Slew_{VHz\_PositiveLimit}$ and $Slew_{VHz\_NegativeLimit}$ and a measured start frequency $F_{start\_measured}$ of the load 117 to generate an initial slewed frequency command $Freq_{slew\_init}$. The frequency command generation module 110 multiplies the initial slewed frequency command $Freq_{slew\_init}$ by 2*pi. A limiter 437 limits the product of the initial slewed frequency command $Freq_{slew\_init}$ and 2*pi, if the product is above the maximum frequency $F_{max}$ or below the negative value of the maximum frequency $F_{max}$, to generate a frequency command Freq_Cmd.

A logic module 440 determines limits for the frequency command Freq_CMD. Depending on the sign of the frequency (positive or negative) command Freq_CMD, the current regulation limiter 111 subtracts or adds the calculated amount to the frequency command. Thus, the logic module 440 may be considered part of the current regulation limiter 111.

A limiter 441 ensures that the frequency command Freq_Cmd is between the outputs of the logic module 440. As a result, the limiter outputs the slewed user frequency command $Freq_{slew\_cmd}$.

Referring back to FIG. 4C, a relational operation module 445 receives the slewed frequency command $Freq_{slew\_cmd}$ and the user frequency start command $F_{reqstart\_cmd}$ multiplied by 2*pi. Based on the slewed frequency command $Freq_{slew\_cmd}$ and the user frequency start command $F_{reqstart\_cmd}$ multiplied by 2*pi, the operation module 445 generates the frequency command for the frequency control mode $F_{fmode}$.

At a low frequency, the relational operation module 445 offsets a commanded frequency by a run boost parameter to provide extra starting torque if needed.

A selector 450 selects either the frequency command $F_{fmode}$ or the frequency command $F_{fmode}$ squared based on the parameter VHz_Sqrt_Select to generate the magnitude VHz_Amplitude.

Referring back to FIG. 4A, a selector 415 selects one of the frequencies $F_{vmode}$ and $F_{fmode}$ based on the selected control mode. More specifically, if the selection signal SEL indicates the voltage control mode, the selector 415 outputs the frequency $F_{vmode}$ as the command $F_{CMD}$. If the selection signal SEL indicates the frequency control mode, the selector 415 outputs the frequency $F_{fmode}$ as the initial voltage command $F_{CMD}$.

Figure 5:
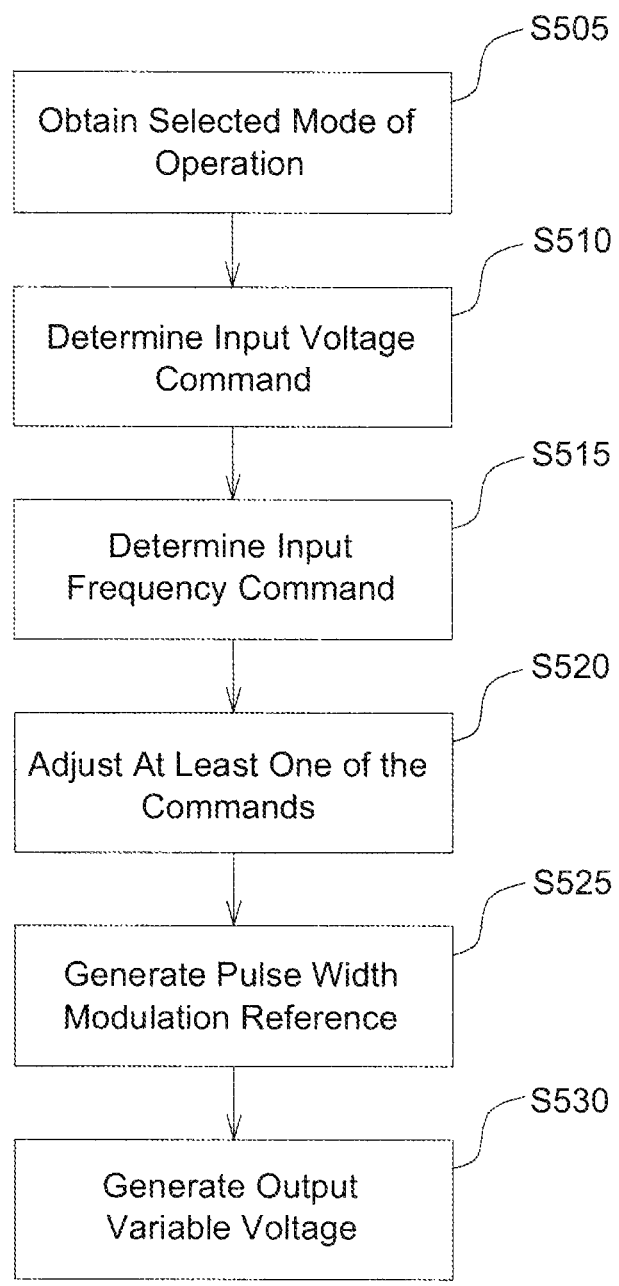

FIG. 5 illustrates a method of generating an output variable voltage, according to an example embodiment. The method may be performed by the system 100, for example.

At S505, a processing system (e.g., processing system 120) obtains a selected mode of operation, the selected mode of operation being one of a voltage control mode and a frequency mode. For example, the processing system receives the mode select signal SEL, as shown in FIG. 1A.

At S510, the processing system determines a voltage command based on the selected mode of operation. For example, the processing system receives the voltage command VoltageAC_Cmd. At S515, the processing system determines an input frequency command based on the selected mode of operation. For example, the processing system receives the user command $Freq_{start\_cmd}$.

At S520, the processing system adjusts at least one of the input frequency command and the input voltage command based on the selected mode of operation. For example, the processing system uses limiters to adjust the input frequency command and the input voltage command. At S525, the processing system generates a pulse width modulation reference (e.g., $V_\alpha$ and $V_\beta$) based on the adjusted at least one of the input frequency command and the input voltage command. At S530, an inverter (e.g., inverter 188) generates the output variable voltage based on the pulse width modulation reference.

In an example embodiment, the method further includes obtaining a selected part of the voltage control mode, the selected part being one of an open loop control part and a closed loop control part.

In an example embodiment, the generating the input voltage command generates the input voltage command based on the selected part.

In an example embodiment, the method further includes selecting one of a plurality of voltage commands as the input voltage command, wherein each of the plurality of voltage commands corresponds to one of the voltage control mode and the frequency mode.

In an example embodiment, the method further includes selecting one of a plurality of frequency commands as the input frequency command, wherein each of the plurality of frequency commands corresponds to one of the voltage control mode and the frequency mode.

In an example embodiment, the generating generates the output variable voltage according to a fixed relationship between the output variable voltage and the adjusted input frequency command in the frequency mode.

In an example embodiment, the adjusting adjusts the at least one of the input frequency command and the input voltage command based on at least one of a temperature limit, a current limit, a current slew limit, a voltage limit and a voltage slew limit.

In an example embodiment, the adjusting adjusts the input voltage command if the selected mode of operation is the voltage control mode.

In an example embodiment, the method further includes maintaining the input frequency command before and after the adjusting.

In an example embodiment, the adjusting adjusts the input frequency command if the selected mode of operation is the frequency mode.

In an example embodiment, the generating generates the output variable voltage according to a fixed relationship between the output variable voltage and adjusts the input frequency command in the frequency mode.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of generating an output variable voltage, the method comprising:
    obtaining a selected mode of operation, the selected mode of operation being one of a voltage control mode and a frequency mode;
    determining an input voltage command based on the selected mode of operation;
    determining an input frequency command based on the selected mode of operation;
    adjusting at least one of the input frequency command and the input voltage command based on the selected mode of operation;
    generating a pulse width modulation reference based on the adjusted at least one of the input frequency command and the input voltage command; and
    generating the output variable voltage based on the pulse width modulation reference.

2. The method of claim 1, further comprising:
    obtaining a selected part of the voltage control mode, the selected part being one of an open loop control part and a closed loop control part.

3. The method of claim 1, further comprising:
    selecting one of a plurality of voltage commands as the input voltage command, wherein each of the plurality of voltage commands corresponds to one of the voltage control mode and the frequency mode.

4. The method of claim 1, wherein the generating generates the output variable voltage according to a fixed relationship between the output variable voltage and an adjusted input frequency command in the frequency mode.

5. The method of claim 1, wherein the adjusting adjusts the at least one of the input frequency command and the input voltage command based on at least one of a temperature limit, a current limit, a current slew limit, a voltage limit and a voltage slew limit.

6. The method of claim 1, wherein the adjusting adjusts the input voltage command if the selected mode of operation is the voltage control mode.

7. The method of claim 1, wherein the adjusting adjusts an input frequency command if the selected mode of operation is the frequency mode.

8. The method of claim 2, wherein the determining the input voltage command generates the input voltage command based on the selected part.

9. The method of claim 3, further comprising:
    selecting one of a plurality of frequency commands as the input frequency command, wherein each of the plurality of frequency commands corresponds to one of the voltage control mode and the frequency mode.

10. The method of claim 6, further comprising:
    maintaining the input frequency command before and after the adjusting.

11. The method of claim 7, wherein the generating generates the output variable voltage according to a fixed relationship between the output variable voltage and adjusts the input frequency command in the frequency mode.

12. A control device configured to generate an output variable voltage, the control device comprising:
    a processor configured to,
        obtain a selected mode of operation, the selected mode of operation being one of a voltage control mode and a frequency mode,
        determine an input voltage command based on the selected mode of operation,
        determine an input frequency command based on the selected mode of operation,
        adjust at least one of the input frequency command and the input voltage command based on the selected mode of operation,
        generate a pulse width modulation reference based on the adjusted at least one of the input frequency command and the input voltage command, and
        generate the output variable voltage based on the pulse width modulation reference.

13. The control device of claim 12, wherein the processor is configured to obtain a selected part of the voltage control mode, the selected part being one of an open loop control part and a closed loop control part.

14. The control device of claim 12, wherein the processor is configured to select one of a plurality of voltage commands as the input voltage command, wherein each of the plurality of voltage commands corresponds to one of the voltage control mode and the frequency mode.

15. The control device of claim 12, wherein the processor is configured to generate the output variable voltage according to a fixed relationship between the output variable voltage and the adjusted input frequency command in the frequency mode.

16. The control device of claim 12, wherein the processor is configured to adjust the at least one of the input frequency command and the input voltage command based on at least one of a temperature limit, a current limit, a current slew limit, a voltage limit and a voltage slew limit.

17. The control device of claim 12, wherein the processor is configured to adjust an input voltage command if the selected mode of operation is the voltage control mode.

18. The control device of claim 12, wherein the processor is configured to adjust an input frequency command if the selected mode of operation is the frequency mode.

19. The control device of claim 13, wherein the processor is configured to generate the input voltage command based on the selected part.

20. The control device of claim 14, wherein the processor is configured to select one of a plurality of frequency commands as the input frequency command, wherein each of the plurality of frequency commands corresponds to one of the voltage control mode and the frequency mode.

21. The control device of claim 17, wherein the processor is configured to maintain the input frequency command before and after the adjusting.

22. The control device of claim 18, wherein the processor is configured to generate the output variable voltage according to a fixed relationship between the output variable voltage and adjust the input frequency command in the frequency mode.

* * * * *